United States Patent
Bohling et al.

(10) Patent No.: US 9,273,221 B2
(45) Date of Patent: Mar. 1, 2016

(54) ACRYLIC LATEX BINDER AND METHOD OF PREPARATION

(71) Applicant: Rohm and Haas Company, Philadelphia, PA (US)

(72) Inventors: James C. Bohling, Lansdale, PA (US); Beth Cooper, Doylestown, PA (US); Wei Gao, Fort Washington, PA (US); Linus W. Linder, Harleysville, PA (US); Alvin M. Maurice, Lansdale, PA (US)

(73) Assignee: ROHM AND HAAS COMPANY, Philadelphia, PA (US)

( * ) Notice: Subject to any disclaimer, the term of this patent is extended or adjusted under 35 U.S.C. 154(b) by 0 days.

(21) Appl. No.: 14/169,504

(22) Filed: Jan. 31, 2014

(65) Prior Publication Data

US 2014/0221560 A1 Aug. 7, 2014

Related U.S. Application Data

(60) Provisional application No. 61/760,348, filed on Feb. 4, 2013.

(51) Int. Cl.
*C09D 133/10* (2006.01)
*C08F 220/14* (2006.01)
*C09D 133/14* (2006.01)

(52) U.S. Cl.
CPC ............ *C09D 133/10* (2013.01); *C08F 220/14* (2013.01); *C09D 133/14* (2013.01)

(58) Field of Classification Search
CPC .................................................. C09D 133/10
See application file for complete search history.

(56) References Cited

U.S. PATENT DOCUMENTS

| | | | |
|---|---|---|---|
| 6,080,802 A | 6/2000 | Emmons et al. | |
| 6,218,456 B1 | 4/2001 | Schlarb et al. | |
| 6,492,451 B1 | 12/2002 | Dersch et al. | |
| 6,545,084 B2 | 4/2003 | Brown et al. | |
| 6,576,051 B2 | 6/2003 | Bardman et al. | |
| 7,179,531 B2 * | 2/2007 | Brown | C08F 2/001 428/407 |
| 7,285,590 B2 | 10/2007 | Holub et al. | |
| 2003/0018103 A1 | 1/2003 | Bardman et al. | |
| 2005/0203211 A1 | 9/2005 | Gebhard | |
| 2005/0222299 A1 | 10/2005 | Garzon et al. | |
| 2007/0043159 A1 | 2/2007 | Bardman et al. | |
| 2008/0146724 A1 | 6/2008 | Bohling et al. | |
| 2010/0010118 A1 | 1/2010 | Bardman | |
| 2010/0063171 A1 | 3/2010 | Roschmann et al. | |
| 2015/0005446 A1 | 1/2015 | Bohling et al. | |

FOREIGN PATENT DOCUMENTS

| | | | |
|---|---|---|---|
| EP | 0609756 A2 | 8/1994 | |
| EP | 1270687 A2 | 1/2003 | |
| WO | 2012166830 A1 | 12/2012 | |
| WO | WO 2012/166830 A1 * | 12/2012 | ............. C09D 17/00 |

OTHER PUBLICATIONS

Yu et al., "Opacity of P(MMA-MAA)-PMMA Composite Latex System with Varying MAA Concentration," Philippine Journal of Science, 140 (2), Dec. 2011, pp. 221-230.

* cited by examiner

*Primary Examiner* — Robert Harlan
(74) *Attorney, Agent, or Firm* — Reid S. Willis

(57) ABSTRACT

The present invention relates to a process comprising contacting methyl methacrylate or styrene; a $C_1$-$C_{10}$-alkyl acrylate; and a polymerizable carboxylic acid monomer with a stable aqueous dispersion of first polymer particles, under emulsion polymerization conditions, to form a stable aqueous dispersion of second polymer particles. The first polymer particles have a $T_g$ in the range of from −30° C. to 30° C., and the monomers have a calculated $T_g$ in the range of 50° C. to 120° C. The present invention also relates to the dispersion of second polymer particles, which is useful as a binder to improve freeze-thaw stability in a coatings formulation.

10 Claims, No Drawings

ACRYLIC LATEX BINDER AND METHOD OF PREPARATION

BACKGROUND OF THE INVENTION

The present invention relates to an acrylic latex binder and a process for its preparation. The binder is useful for preparing paints with improved freeze-thaw stability.

Latex paints generally require anti-freeze additives, such as ethylene glycol or propylene glycol, to provide acceptable freeze-thaw stability. Although these additives are effective for their intended purpose, their future for use in paints is at the mercy of nascent regulations designed to lower and even eliminate volatile organic compounds (VOCs) in consumer products. Attempts to achieve freeze-thaw stability by incorporating higher levels of acid or surfactants into the binder polymer have deleteriously increased water sensitivity. Accordingly, it would be desirable to find alternative approaches to achieve acceptable freeze-thaw stability in paints while maintaining other desirable properties such as acceptable film formation and water insensitivity.

SUMMARY OF THE INVENTION

The present invention addresses a need in the art by providing, in one aspect, a method comprising the step of contacting monomers with a stable aqueous dispersion of first polymer particles under emulsion polymerization conditions to form a stable aqueous dispersion of second polymer particles, wherein:

a) the first polymer particles comprise structural units of methyl methacrylate or styrene or a combination thereof; and a $C_1$-$C_{10}$-alkyl acrylate; and have a $T_g$ in the range of from −30° C. to 30° C.;

b) the monomers comprise methyl methacrylate or styrene or a combination thereof, a polymerizable carboxylic acid monomer, and a sufficient amount of a $C_1$-$C_{10}$-alkyl acrylate to achieve a calculated $T_g$ in the range of 50° C. to 120° C.;

c) the concentration of the polymerizable carboxylic acid monomer is from 2 to 10 weight percent, based on the weight of the monomers; and d) the weight-to-weight ratio of the monomers to the first polymer particles is in the range of 1:99 to 8:92.

The method of the present invention addresses a need in the art by providing a method for preparing a binder and a low VOC paint formulation with good freeze-thaw stability.

In a second aspect, the present invention is a composition comprising a stable aqueous dispersion of polymer particles comprising structural units of: a) methyl methacrylate or styrene; b) a $C_1$-$C_{10}$-alkyl acrylate; c) a polymerizable carboxylic acid monomer; d) a phosphorus acid monomer; wherein the aqueous phase comprise oligomers comprising structural units of a polymerizable carboxylic acid monomer, methyl methacrylate or styrene, a $C_1$-$C_{10}$-alkyl acrylate, and an absence of structural units of the phosphorus acid monomer; wherein the concentration of the oligomers with a molecular weight above 1000 Daltons is in the range of 0.4 to 0.75 g/L and the concentration of the oligomers with a molecular weight above 5000 Daltons is in the range of 0.1 to 0.35 g/L.

DETAILED DESCRIPTION OF THE INVENTION

In a first aspect, the present invention is a method comprising the step of contacting monomers with a stable aqueous dispersion of first polymer particles under emulsion polymerization conditions to form a stable aqueous dispersion of second polymer particles, wherein:

a) the first polymer particles comprise structural units of methyl methacrylate or styrene or a combination thereof; and a $C_1$-$C_{10}$-alkyl acrylate; and have a $T_g$ in the range of from −30° C. to 30° C.;

b) the monomers comprise methyl methacrylate or styrene or a combination thereof, a polymerizable carboxylic acid monomer, and a sufficient amount of a $C_1$-$C_{10}$-alkyl acrylate to achieve a calculated $T_g$ in the range of 50° C. to 120° C.;

c) the concentration of the polymerizable carboxylic acid monomer is from 2 to 10 weight percent, based on the weight of the monomers; and d) the weight-to-weight ratio of the monomers to the first polymer particles is in the range of 1:99 to 8:92.

As used herein, the term "structural units" of the named monomer refers to the remnant of the monomer after polymerization. For example, a structural unit of methyl methacrylate is as illustrated:

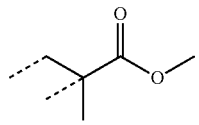

structural unit of methyl methacrylate

The first polymer particles preferably further comprise, based on the weight of the first polymer particles, from 0.3 to 3 weight percent structural units of a phosphorus acid monomer or a salt thereof; and further comprise from 0.2 to 2 weight percent structural units of a polymerizable carboxylic acid monomer.

The stable aqueous dispersion of the first polymer particles is advantageously prepared by a 2-stage emulsion polymerization process as follows: In a first stage, methyl methacrylate, the $C_1$-$C_{10}$-alkyl acrylate, and, optionally, a polymerizable carboxylic acid monomer, are contacted under emulsion polymerization conditions to form a first stage polymer having a $T_g$ (calculated using the Fox equation, infra) preferably from −30° C., more preferably from −10° C., and most preferably from 0° C., to 30° C., and more preferably to 25° C. The preferred concentrations of monomers in this first stage process, based on the total weight of monomers used to prepare the first stage polymer particles, are as follows: from 40 to 65 weight percent methyl methacrylate or styrene, or a combination thereof, preferably methyl methacrylate; from 35 to 70 weight percent of the $C_1$-$C_{10}$-alkyl acrylate; and from 0.1 to 1.5, more preferably to 1 weight percent of the polymerizable carboxylic acid monomer.

Examples of preferred $C_1$-$C_{10}$-alkyl acrylates include ethyl acrylate, butyl acrylate, 2-ethylhexyl acrylate, and 2-propylheptyl acrylate and a combination thereof; more preferably ethyl acrylate and butyl acrylate; and most preferably butyl acrylate. Examples of preferred polymerizable carboxylic acid monomers include methacrylic acid, acrylic acid, and itaconic acid, and a salt thereof, with methacrylic acid being more preferred. The polymerizable carboxylic acid monomer is preferably added in the first stage.

The aqueous dispersion of first stage polymer particles is advantageously contacted over time with a second monomer emulsion comprising methyl methacrylate or styrene or a combination thereof, and a $C_1$-$C_{10}$-alkyl acrylate, which may be the same as or different from the $C_1$-$C_{10}$-alkyl acrylate used to make the first stage polymer. The preferred concentration of monomers in this second stage process, based on the weight of total monomers, is as follows: 40 to 65 weight percent methyl methacrylate or styrene, or a combination thereof, preferably methyl methacrylate; and 35 to 70 weight percent of the $C_1$-$C_{10}$-alkyl acrylate. The weight-to-weight ratio of the monomers used to make the first stage polymer to the monomers used to make the second stage polymer is preferably in the range of 30:70 to 60:40. The preferred $T_g$ of the first polymer particles is from −10° C., more preferably from 0° C., to 25° C.

It is preferred that a phosphorus acid monomer is included in either the first or second stages or both at a total concentration of 0.3 to 3 weight percent, based on the weight of the first and second stage monomers. More preferably, the phosphorus acid monomer is used in the second stage at a concentration of from 0.5 to 5 weight percent, based on the weight of the second stage monomers. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylates, with phosphoethyl methacrylate being especially preferred. "Phosphoethyl methacrylate" (PEM) is used herein to refer to the following structure:

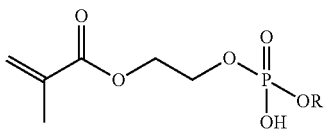

where R is H or

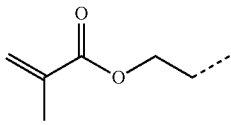

A preferred phosphonate is 2-methacryloyloxyethyl methacrylate (MEP).

The polymerizable carboxylic acid monomer may optionally be included in the second stage monomer emulsion. Preferably, the polymerizable carboxylic acid monomer is included in both stages at a total concentration in the range of 0.2 to 2 weight percent, based on the weight of monomers in the first and second stages.

It is also preferred that an ambient curing crosslinking monomer such as acetoacetoxyethyl methacrylate (AAEM) is also included in either the first or second stage or both at a concentration of from 1 to 10 weight percent, based on the weight of the first and second stage monomers.

The dispersion of first polymer particles more preferably comprises, based on the weight of the polymer particles, 45 to 60 weight percent, structural units of methyl methacrylate; from 45 to 70, more preferably to 60 weight percent of ethyl acrylate, butyl acrylate, 2-ethylhexyl acrylate, or 2-propylheptyl acrylate or a combination thereof, more preferably ethyl acrylate or butyl acrylate, and most preferably butyl acrylate; from 0.5 to 1.5 weight percent methacrylic acid, acrylic acid, or itaconic acid, or a salt thereof, most preferably methacrylic acid or a salt thereof; from 0.5 to 2 weight percent phosphoethyl methacrylate or 2-methacryloylethyl phosphonate or a salt thereof; and from 1 to 5 weight percent acetoacetoxyethyl methacrylate.

The stable aqueous dispersion of the first polymer particles are then contacted with monomers under polymerization conditions, to form a stable aqueous dispersion of the second polymer particles.

Preferably, the monomers and water are added in a single shot to the dispersion of the first polymer particles. The monomers comprise styrene or methyl methacrylate or a combination thereof, and a sufficient amount of a $C_1$-$C_{10}$-alkyl acrylate to achieve a calculated $T_g$ in the range of 50° C. to 120° C. As used herein, the term "achieve a calculated $T_g$ in the range of 50° C. to 120° C." is used to mean that the monomers are present in such relative amounts that a polymer formed by emulsion polymerization of a monomer mixture comprising such monomers would have a calculated $T_g$ in the stated range, as measured by the Fox equation. Thus, the calculated $T_g$ of a mixture of 20 weight percent butyl acrylate, 72 weight percent methyl methacrylate, and 8 weight percent methacrylic acid would have a $T_g$ of 63° C. calculated as follows:

$$1/T_g(\text{calc.}) = w(M_1)/T_g(M_1) + w(M_2)/T_g(M_2) + \ldots + w(M_n)/T_g(M_n)$$

wherein:

$T_g$(calc.) is the glass transition temperature calculated for the copolymer $w(M_1)$ is the weight fraction of monomer $M_1$ in the copolymer $w(M_2)$ is the weight fraction of monomer $M_2$ in the copolymer $w(M_n)$ is the weight fraction of monomer $M_n$ in the copolymer $T_g(M_1)$ is the glass transition temperature (Kelvin) of the homopolymer of $M_1$ $T_g(M_2)$ is the glass transition temperature (Kelvin) of the homopolymer of $M_2$ The glass transition temperature of homopolymers may be found, for example, in "Polymer Handbook", edited by J. Brandrup and E. H. Immergut, Interscience Publishers.

The preferred calculated $T_g$ is in the range of from 55° C. to 80° C., more preferably to 70° C. The preferred concentrations of monomers added to the first polymer particles, based on the weight of total monomers, are as follows: 50 to 90 weight percent methyl methacrylate or styrene or a combination thereof, preferably methyl methacrylate; 10 to 25 weight percent $C_1$-$C_{10}$-alkyl acrylate, preferably ethyl acrylate, butyl acrylate, 2-ethylhexyl acrylate, or 2-propylheptyl acrylate; more preferably ethyl acrylate or butyl acrylate; and most preferably butyl acrylate; 4 to 9 weight percent of the polymerizable carboxylic acid monomer, preferably acrylic, methacrylic, or itaconic acid or salts thereof, and most preferably methacrylic acid or a salt thereof. Preferably, the weight-to-weight percent of the monomers to the first polymer particles is in the range of 1:99 to 6:94.

The weight average particle size of the second polymer particles, as measured by a Brookhaven BI-90 Plus Particle Size Analyzer, is from 90 nm to 200 nm, preferably to 140 nm.

The aqueous phase of the stable aqueous dispersion of the second polymer particles comprises oligomers containing structural units of the polymerizable carboxylic acid monomer, methyl methacrylate or styrene, the $C_1$-$C_{10}$-alkyl acrylate, and an absence of structural units of the phosphorus acid monomer. For a latex having a solids content of 44 to 47 weight percent, the fraction of the oligomers with a molecular weight above 1000 Daltons (relative to poly(methylacrylic acid) standards) is in the range of 0.4 to 0.75 g/L and the concentration of the oligomers with a molecular weight above 5000 Daltons (relative to poly(methylacrylic acid) standards) is in the range of 0.1 to 0.35 g/L.

The stable aqueous dispersion of second polymer particles is useful as a binder in paint formulations. Thus, in a further step of the method of the present invention, pigment particles are contacted with agitation with the stable aqueous dispersion of second polymer particles, preferably along with one or more additives to form a paint formulation with acceptable freeze-thaw stability. Preferred pigment particles are $TiO_2$ particles; examples of other additives include one or more of fillers; rheology modifiers; hollow pigments, including pigments having one or more voids; dispersants; surfactants; defoamers; preservatives; flow agents; leveling agents; coalescents, especially low VOC coalescents; and neutralizing agents. It has surprisingly been discovered that a paint formulation prepared using the binder made by the process of the present invention gives excellent freeze-thaw and shelf stability in the absence or substantial absence of VOCs, that is, not greater than 50 g/L VOCs as measured by ASTM D6886-12.

EXAMPLES

Example 1

Three-Stage Process, 3% Third Stage with 8% MAA

A first monomer emulsion was prepared by mixing deionized water (160.0 g), Disponil FES 32 surfactant (38.1 g, 30% active), butyl acrylate (323.6 g), methyl methacrylate (396.2 g), and methacylic acid (2.9 g). A second monomer emulsion was prepared by mixing deionized water (272.1 g), Disponil FES 993 surfactant (37.5 g, 30% active), phosphoethyl methacrylate (29.8 g, 60% active), butyl acrylate (452.7 g), methyl methacrylate (422.4 g), acetoacetoxyethyl methacylate (74.5 g), and methacylic acid (9.9 g). A third monomer mixture was prepared by mixing deionized water (43.8 g), butyl acrylate (10.5 g), methyl methacrylate (38.0 g), and methacylic acid (4.3 g).

Deionized water (1106.3 g) and Disponil FES 32 surfactant (2.3 g, 30% active) were added to a 5-L, four-necked round-bottom flask equipped with a paddle stirrer, a thermometer, nitrogen inlet, and a reflux condenser. The contents of the flask were heated to 85° C. under a $N_2$ atmosphere, and stirring was initiated. A portion of the first monomer emulsion (110.4 g) was added to the flask followed by a rinse of DI water (5.0 g). A solution of sodium persulfate (5.4 g) dissolved in deionized water (33.9 g), followed by a rinse of deionized water (6.7 g) was subsequently added to the reactor. After stirring for 10 min, the remainder of the first monomer emulsion was added over 45 min followed by a DI water rinse (27.0 g). An initiator solution of sodium persulfate (0.58 g) dissolved in DI water (31.7 g) was added separately added over 45 min. Stirring was continued at 85° C. for 15 min.

The second monomer emulsion and an initiator solution containing sodium persulfate (0.99 g) dissolved in DI water (52.8 g) were added linearly and separately to the vessel over 75 min. The temperature was maintained at 85° C. The second monomer emulsion vessel was rinsed to the reactor with deionized water (27 g).

When all additions were complete, the flask was cooled to 65° C. The third monomer mix was added to the kettle as in a single shot. Subsequently, a solution of sodium persulfate (0.047 g) and t-butyl hydroperoxide (0.39, 70%) dissolved in DI water (2.6 g) was added to the flask followed by a solution of copper nitrate (0.05 g, 42% active), VERSENE™ Chelating Agent (A Trademark of The Dow Chemical Company or its Affiliates, 0.01 g, 1% active), and isoascorbic acid (0.29 g) dissolved in DI water (14.5 g).

After 10 min, solutions of t-butyl hydroperoxide (0.58 g, 70%) in deionized water (14.2 g) and isoascorbic acid (0.44 g) in deionized water (14.2 g) were separately added to the flask over 15 min to reduce residual monomer as the reactor continued to cool. The polymer was then neutralized to pH 9.0 with an ammonium hydroxide solution (43.0 g, 30%). The particle size as measured by a Brookfield BI-90 Plus Particle Size Analyzer was 107 nm and the solids were determined to be 45.5%.

Example 2

Three-Stage Process, 5% Third Stage with 5% MAA

Example 2 followed the process of Example 1 except that the 3rd monomer emulsion was prepared by mixing deionized water (73 g), butyl acrylate (18 g), methyl methacrylate (66 g), and methacylic acid (4.4 g). The particle size as measured by a Brookfield BI-90 Plus Particle Size Analyzer was 106 nm and the solids were determined to be 46.3%.

Comparative Example 1

Two-Stage Process

A first monomer emulsion was prepared by mixing deionized water (160.0 g), Disponil FES 32 surfactant (38.1 g, 30% active), butyl acrylate (323.6 g), methyl methacrylate (396.2 g), and methacylic acid (2.9 g). A second monomer emulsion was prepared by mixing deionized water (272.1 g), Disponil FES 993 surfactant (37.5 g, 30% active), phosphoethyl methacrylate (29.8 g, 60% active), butyl acrylate (452.7 g), methyl methacrylate (422.4 g), acetoacetoxyethyl methacylate (74.5 g), and methacylic acid (9.9 g).

Deionized water (1106.3 g) and Disponil FES 32 surfactant (2.3 g, 30% active) were added to a 5-L, four-necked round-bottom flask equipped with a paddle stirrer, a thermometer, $N_2$ inlet, and a reflux condenser. The contents of the flask were heated to 85° C. under a $N_2$ atmosphere and stirring was initiated. A portion of the first monomer emulsion (110.4 g) was added to the flask followed by a rinse of DI water (5.0 g). A solution of sodium persulfate (5.4 g) dissolved in deionized water (33.9 g), followed by a rinse of deionized water (6.7 g) was subsequently added to the reactor. After stirring for 10 min, the remainder of the first monomer emulsion was added over 45 min followed by a DI water rinse (27.0 g). An initiator solution of sodium persulfate (0.58 g) dissolved in DI water (31.7 g) was added separately added over 45 min. Stirring was continued at 85° C. for 15 min.

The second monomer emulsion and an initiator solution containing sodium persulfate (0.99 g) dissolved in DI water (52.8 g) were added linearly and separately to the vessel over 75 min. The temperature was maintained at 85° C. The second monomer emulsion vessel was rinsed to the reactor with deionized water (27 g).

When all additions were complete, the flask was cooled to 65° C. Copper nitrate (0.05 g, 42% active) and VERSENE™ Chelating Agent (0.01 g, 1% active), were added to the flask. Solutions of t-butyl hydroperoxide (0.58 g, 70%) in deionized water (14.2 g) and isoascorbic acid (0.44 g) in deionized water (14.2 g) were separately added to the flask over 15 min to reduce residual monomer as the reactor continued to cool. The polymer was then neutralized to pH 9.0 with an ammonium hydroxide solution (43.0 g, 30%). The particle size as measured by a Brookfield BI-90 Plus Particle Size Analyzer was 112 nm and the solids were determined to be 46.1%.

Comparative Example 2

Three-Stage Process, 3% Third Stage with 12% MAA

Comparative Example 2 was carried out substantially as described in Example 1 except that the third monomer emulsion was prepared by mixing deionized water (43.8 g), butyl acrylate (10.5 g), methyl methacrylate (36.0 g), and methacrylic acid (6.3 g). The particle size as measured by a Brookfield BI-90 Plus Particle Size Analyzer was 131 nm and the solids were determined to be 45.9%.

Comparative Example 3

Three-Stage Process, 5% Third Stage with No MAA

Comparative Example 3 followed the process of Example 1 except that the third monomer emulsion was prepared by mixing deionized water (73 g), butyl acrylate (18 g) and methyl methacrylate (70 g). The particle size as measured by a Brookfield BI-90 Plus Particle Size Analyzer was 106 nm and the solids were determined to be 46.2%.

Particle Size Growth Test Method

One-qt containers were filled with each of the latex samples. The initial particle size was measured using BI-90 Plus Particle Size Analyzer. The containers were then sealed and placed in an oven at 60° C. for 10 days. The containers were removed and particle size was measured. The difference in particle size (ΔPS) is shown in Table 1.

TABLE 1

Particle Size Growth after 10 days at 60° C.

| | $3^{rd}$ Stage MAA Level | Initial PS, nm | ΔPS, nm |
|---|---|---|---|
| Example 1 | 8% | 107 | 0 |
| Comparative Ex. 1 | — | 112 | 0 |
| Comparative Ex. 2 | 12% | 131 | 30 |

Table 1 shows that particle stability is not achieved when the $3^{rd}$ stage comprises 3 weight percent of the polymer particles and methacrylic acid comprises 12 weight percent of the $3^{rd}$ stage; however, stability is achieved where the 3 weight percent $3^{rd}$ stage comprises 8 weight percent methacrylic acid or where no third stage is present.

Paint Formulation and Testing

A. Semigloss Paints

Semigloss paints were formulated to 31 PVC/39.9% volume solids with 19 PVC Kronos 4311 TiO2 slurry and 11 PVC of Ropaque™ Ultra EF. Acrysol™ associative thickeners were added to generate a Stormer Viscosity of 95-105 Krebs units and an ICI viscosity of 1.4 to 1.7. Paints were coalesced with 1 wt % of low volatility coalescent and 0.08 wt % of propylene glycol was added.

Half-pint metal containers were filled to 75% capacity with the coating formulation sample. The initial KU viscosity was measured. The containers then were sealed and placed into a 0° F. (~–18° C.) freezer for 16 h. The containers were removed and allowed to thaw at room temperature for 8 h. The aqueous coatings were hand-sheared and the KU viscosity of the coating was measured and a delta KU relative to the initial measurement was recorded. The freeze/thaw was repeated for up to five cycles or until the viscosity was too high to measure. The number of cycles before the viscosity was not measurable is shown in Table 2.

TABLE 2

Freeze Thaw Stability

| Paint Binder | MAA Level | Freeze-Thaw Cycles |
|---|---|---|
| Example 1 | 8% | 5 |
| Comparative Ex. 1 | — | Failed $1^{st}$ cycle |

As Table 2 shows, the absence of a $3^{rd}$ stage results in poor freeze-thaw stability.

B. Flat Paints

Semigloss paints were formulated to 49.6% PVC/36.4% volume solids with 17 PVC Kronos 4311 TiO$_2$ slurry and 7.3 PVC of ROPAQUE™ Ultra EF Opaque Polymer (A Trademark of The Dow Chemical Company or its Affiliates) and inorganic extenders (25.6 g). Thickeners were added to adjust Stormer Viscosity to 101-107 Krebs units and ICI viscosity to 1.6 to 1.7. Paints were coalesced with 1 wt % of low volatility coalescent and 0.08 wt % of propylene glycol was added.

Paints of Example 2 and Comparative Example 3

Semigloss paints were formulated to 19 PVC/35% volume solids with 19 PVC Kronos 4311 TiO2 slurry. Acrysol™ and Tamol™ associative thickeners were added to generate a Stormer Viscosity of 96-97 Krebs units and an ICI viscosity of 1.8. Paints were coalesced with 2 wt % of low volatility coalescent and 0.3 wt % of ethylene glycol was added. Results of freeze thaw testing are in Table 3.

TABLE 3

Freeze Thaw Stability

| Paint Binder | MAA Level | Freeze-Thaw Cycles |
|---|---|---|
| Example 2 | 8% | $3^a$ |
| Comparative Ex. 3 | 0% | Failed $1^{st}$ cycle |

$^a$Test was ended at 3 cycles

Table 3 shows that a paint formulation containing a latex binder made with 5 weight percent of a $3^{rd}$ stage that does not contain methacrylic acid exhibits poor freeze-thaw stability. In contrast, the formulation containing a binder made by the process of the present invention shows freeze-thaw stability over 3 cycles.

Aqueous Phase Oligomers Test Method

The aqueous soluble oligomers in the serum phase of emulsion samples were measured using Gel Permeation Chromatography (GPC) analysis. The latex samples were centrifuged under 543,000 g-force for 30 min at 20° C. The obtained supernatants were collected as aqueous phase samples. A Waters HPLC system consisting of a 2690 separation model, a 410 differential refractive index detector (dRI), and Empower software was used for the GPC analysis. A 20 mM ammonium acetate buffer at pH 9.0 was used as eluent, and an 8-mm×300-mm Shodex OHpak SB802.5 HQ GPC column was used to separate components in the aqueous phase samples. The relative molecular weight of the oligomers were determined using poly(methyacrylate acid) sodium salt narrow molecular weight standards (supplied by American Polymer Standards Cooperation, OH) with peak molecular weight of 31500, 15400, 6610, 3570, 1670 and 1200 Daltons. The obtained linear molecular weight calibration curve was used to define the relative molecular weights of the oligomers at each elution moment. The dRI response factor was calibrated using a poly(ethylene oxide) standard (from TOSOH corporation, Japan, MW=44900 Daltons) at a known concentration and using a refractive index increment (dn/dc) of 0.136 mL/g. The concentration of the oligomers over a certain molecular weight range was determined based on the corresponding peak area of the oligomers, GPC flow rate, injection volume, and dRI detector response factor.

The fraction of the aqueous phase with oligomers having molecular weights greater than 5000 Daltons was found to be 0.3 g/L; the fraction with molecular weights greater than 1000 Daltons was 0.7 g/L. The oligomers contained structural units of methacrylic acid and methyl methacrylate, most, if not all of the oligomers, contained no structural units of PEM.

The invention claimed is:

1. A method comprising the step of contacting monomers with a stable aqueous dispersion of first polymer particles under emulsion polymerization conditions to form a stable aqueous dispersion of second polymer particles, wherein:
   a) the first polymer particles comprise structural units of methyl methacrylate or styrene or a combination thereof; and a $C_1$-$C_{10}$-alkyl acrylate; and have a $T_g$ in the range of from −30° C. to 30° C.;
   b) the monomers comprise methyl methacrylate or styrene or a combination thereof, a polymerizable carboxylic acid monomer, and a sufficient amount of $C_1$-$C_{10}$-alkyl acrylate to achieve a calculated $T_g$ in the range of 50° C. to 120° C.;
   c) the concentration of the polymerizable carboxylic acid monomer is from 2 to 10 weight percent, based on the weight of the monomers; and
   d) the weight-to-weight ratio of the monomers to the first polymer particles is in the range of 1:99 to 8:92.

2. The method of claim 1 wherein the first polymer particles further comprise, based on the weight of the first polymer particles: a) from 0.3 to 3 weight percent structural units of a phosphorus acid monomer or a salt thereof; and b) from 0.2 to 2 weight percent structural units of a carboxylic acid monomer; and wherein the polymerizable carboxylic acid monomer is methacrylic acid or acrylic acid or a salt thereof at a concentration of 4 to 9 weight percent, based on the weight of the monomers; and the weight-to-weight ratio of the monomers to the first polymer particles is in the range of 1:99 to 5:95.

3. The method of claim 2 wherein the first polymer particles comprise from 0.5 to 2 weight percent structural units of phosphoethyl methacrylate or 2-methacryloyloxyethyl phosphonate, or a salt thereof, based on the weight of the first polymer particles; the first polymer particles further comprise from 1 to 10 weight percent of an ambient curing crosslinking monomer based on the weight of the first polymer particles; and wherein the monomers are added along with water to the stable aqueous dispersion of first polymer particles in a single shot.

4. The method of any of claims 3 wherein the stable aqueous dispersion of the first polymer particles are prepared by the steps of:
   a) polymerizing, under emulsion polymerization conditions first stage monomers comprising, based on the weight of the first stage monomers, 1) from 40 to 65 weight percent methyl methacrylate; and 2) from 35 to 70 weight percent of a $C_1$-$C_{10}$-alkyl acrylate;
   b) contacting, under emulsion polymerization conditions, the first stage polymer with second stage monomers comprising, based on the weight of the second stage monomers, 1) from 40 to 60 weight percent methyl methacrylate; and 2) from 35 to 70 weight percent of a $C_1$-$C_{10}$-alkyl acrylate;
   wherein either the first or second stage monomers or both further comprise, based on the weight of the first and the second stage monomers,
   c) from 0.2 to 2 weight percent methacrylic acid or acrylic acid or itaconic acid or a salt thereof; and
   d) from 0.3 to 3 weight percent of a phosphorus acid monomer or a salt thereof.

5. The method of claim 4 wherein the second stage monomers further comprise, based on the weight of the second stage monomers, from 1 to 10 weight percent of an ambient curing crosslinking monomer.

6. The method of claim 4 wherein the $C_1$-$C_{10}$-alkyl acrylate in steps a) and b) is butyl acrylate or ethyl acrylate or a combination thereof; the phosphorus acid monomer is phosphoethyl methacrylate or 2-methacryloyloxyethyl methacrylate or a salt thereof; and wherein the second stage monomers further comprise from 1 to 10 weight percent acetoacetoxyethyl methacrylate.

7. The method of claim 6 wherein the $C_1$-$C_{10}$-alkyl acrylate in steps a) and b) is butyl acrylate; and the phosphorus acid monomer is phosphoethyl methacrylate or a salt thereof;
   wherein the concentration of methyl methacrylate in the first and stage monomers, based on the weight of the first and second stage monomers, is in the range of from 45 to 60 weight percent; and the concentration of butyl acrylate in the first and second stage monomers, based on the weight of the first and second stage monomers, is in the range of from 45 to 60 weight percent.

8. The method of any of claims 1 which further includes the step of contacting the stable aqueous dispersion of the second polymer particles with $TiO_2$ particles and one or more additives to form a paint, wherein the additives are selected from the group consisting of fillers; rheology modifiers; hollow pigments; dispersants; surfactants; defoamers; preservatives; flow agents; leveling agents; low VOC coalescents; and neutralizing agents.

9. The method of claim 8 wherein the paint has a VOC level of not greater than 50 g/L.

10. A composition comprising a stable aqueous dispersion of polymer particles comprising structural units of: a) methyl methacrylate or styrene; b) a $C_1$-$C_{10}$-alkyl acrylate; c) a polymerizable carboxylic acid monomer; d) a phosphorus acid monomer; wherein the aqueous phase comprise oligomers comprising structural units of a polymerizable carboxylic acid monomer, methyl methacrylate or styrene, a $C_1$-$C_{10}$-alkyl acrylate, and an absence of structural units of the phosphorus acid monomer; wherein the concentration of the oligomers with a molecular weight above 1000 Daltons is in the range of 0.4 to 0.75 g/L and the concentration of the oligomers with a molecular weight above 5000 Daltons is in the range of 0.1 to 0.35 g/L.

* * * * *